F. ANDERSEN.
ELASTIC NON-PNEUMATIC TIRE.
APPLICATION FILED JUNE 6, 1918.

1,289,070.

Patented Dec. 31, 1918.

Inventor,
Fridtjov Andersen,
By
Atty.

UNITED STATES PATENT OFFICE.

FRIDTJOV ANDERSEN, OF CHRISTIANIA, NORWAY.

ELASTIC NON-PNEUMATIC TIRE.

1,289,070.

Specification of Letters Patent. Patented Dec. 31, 1918.

Application filed June 6, 1918. Serial No. 238,580.

*To all whom it may concern:*

Be it known that I, FRIDTJOV ANDERSEN, a subject of the King of Norway, residing at Christiania, in the Kingdom of Norway, have invented certain new and useful Improvements in Elastic Non-Pneumatic Tires; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The present invention has for its object an elastic tire of the kind, in which a flexible elastic tire fastened to the rim is distended by means of steel springs.

The principal feature of the invention consists in providing the inside of the tread with ring segments or blocks which are pressed outward against the flexible cover by means of unbroken elastic rings, inclosing the wheel.

The invention also comprises other features which will be described in the following specification.

Figure 1:
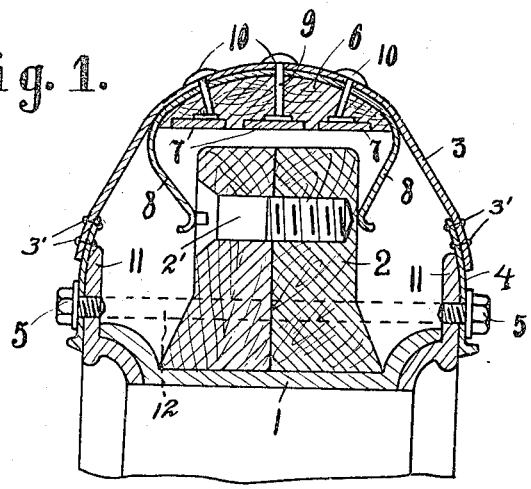
Figure 2:
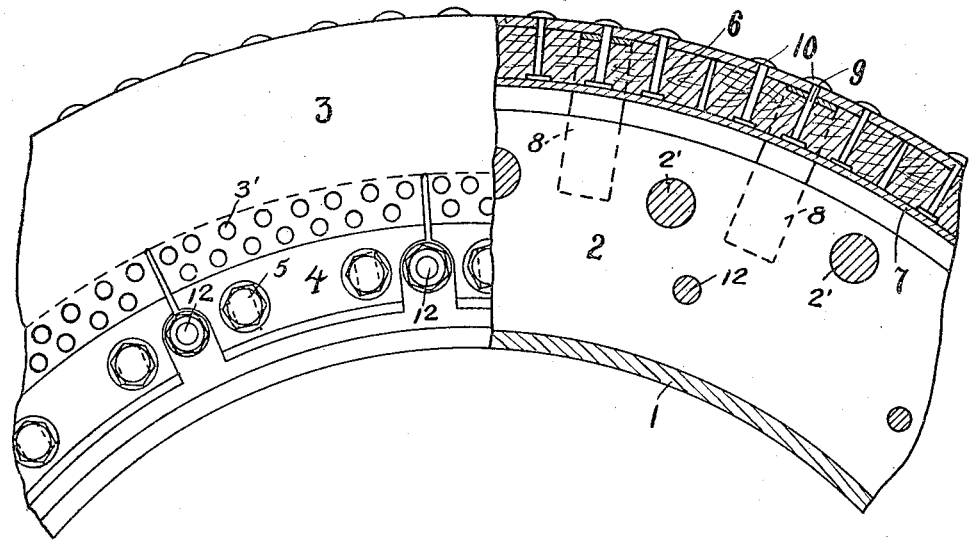

On the drawing Figure 1 is a cross section and Fig. 2 a fragmentary view partly in side elevation and partly in longitudinal section of an embodiment of the invention.

On the rim 1 is mounted a solid ring 2 which may consist of wood, rubber or the like. This ring is preferably formed of two or more annular pieces connected together by transverse screws 2′. To the rim edges is fastened a cover 3, which may consist of cloth, balata or other flexible material. The cover 3 along both edges is connected by rivets 3′ to metal plates 4, fastened to the rim flanges by means of bolts 5. The tread of the cover 3 on the inside is provided with ring segment blocks 6, which are pressed radially outward by means of annular spring 7, the diameter of which is somewhat larger than the outer diameter of the ring 2.

At suitable intervals the annular segments 6 are provided with elastic hoops 8, the legs of which grip the ring 2 and serve to steady the tire in a lateral direction. The rivets 9 by means of which the annular segments 6 are fastened to the cover are on their outside provided with large heads 10, which form a good protection for the tread.

When this tire is to be mounted on normal rim, the rim is provided on each side with a loose flange 11, said flanges being connected by means of bolts 12.

Claims:

1. A resilient non-pneumatic tire, comprising a flexible cover, solid ring segments fastened to the inside of the same, annular springs of a larger diameter than the wheel rim acting to press said ring segments radially outward, and means to restrict lateral movement of said segments.

2. A resilient non-pneumatic tire, comprising a flexible cover, solid ring segments fastened to the inside of the same, a rigid ring mounted upon the wheel rim inside said cover, and annular springs of a larger diameter than said ring acting to press said ring segments radially outward.

3. A resilient non-pneumatic tire, comprising a flexible cover, solid ring segments fastened to the inside of the same, a rigid ring mounted upon the wheel rim inside said cover, elastic hoops fastened to said segments and gripping each side of the ring, and annular springs of a larger diameter than said ring acting to press said ring segments radially outward.

In testimony that I claim the foregoing as my invention, I have signed my name in presence of two subscribing witnesses.

FRIDTJOV ANDERSEN.

Witnesses:
O. NAUNAN,
H. E. CARLSON.